United States Patent [19]
Butler et al.

[11] Patent Number: 5,953,183
[45] Date of Patent: Sep. 14, 1999

[54] HEAD STACK ASSEMBLY FOR A MAGNETIC DISK DRIVE WITH A PASS-THROUGH FLEX CIRCUIT CABLE

[75] Inventors: Walter Wayne Butler, Felton; Payman Hassibi; Mark A. Hathaway, both of San Jose; Tami Ogle, Santa Clara; Sudha Narayanan, San Jose, all of Calif.

[73] Assignee: Western Digital Corporation, Irvine, Calif.

[21] Appl. No.: 08/971,355

[22] Filed: Nov. 17, 1997

[51] Int. Cl.$^6$ .............................. G11B 5/54; G11B 21/08
[52] U.S. Cl. ...................... 360/106; 360/104; 360/97.01
[58] Field of Search .............................. 360/97.01, 97.02, 360/106, 105, 104

[56] References Cited

U.S. PATENT DOCUMENTS

| | | | |
|---|---|---|---|
| 4,933,785 | 6/1990 | Morehouse et al. | 360/78.04 |
| 5,103,359 | 4/1992 | Marazzo | 360/104 |
| 5,109,310 | 4/1992 | Ohkjita et al. | 360/106 |
| 5,130,895 | 7/1992 | Somemiya et al. | 361/398 |
| 5,161,074 | 11/1992 | Forbord et al. | 360/97.01 |
| 5,185,683 | 2/1993 | Oberg et al. | 360/104 |
| 5,270,887 | 12/1993 | Edwards et al. | 360/106 |
| 5,325,252 | 6/1994 | Yagi et al. | 360/106 |
| 5,375,021 | 12/1994 | Boeckner | 360/97.01 |
| 5,426,549 | 6/1995 | Sakai | 360/106 |
| 5,818,667 | 10/1998 | Larson | 360/106 |

*Primary Examiner*—John H. Wolff
*Attorney, Agent, or Firm*—Leo J. Young; Milad Shara

[57] ABSTRACT

A magnetic disk drive with a head stack assembly having a pass-through flex circuit cable is disclosed. The pass-through flex circuit cable is mounted to a side of the head stack assembly to extend straight forward in an initial unfolded position during handling and assembly and to then be folded over into a final position in a substantially opposite direction and with a desired flex cable trajectory. The head stack assembly includes a post, preferably of rectangular profile, that is integrally formed and spaced away from the actuator body. An outer surface of the post defines the flex cable trajectory. The flex circuit cable, located in the space between the actuator body and the post, extends past the post in the initial position and wraps around the post in the final folded over position. The flex circuit cable is secured to the post in the final folded over position, preferably with a flex clip that removably mounts to the post. The pass-through flex circuit cable of the present invention makes it less likely that the flex cable circuit will be damaged and provides more room for electronic components and for performing lead attachment operations.

37 Claims, 6 Drawing Sheets

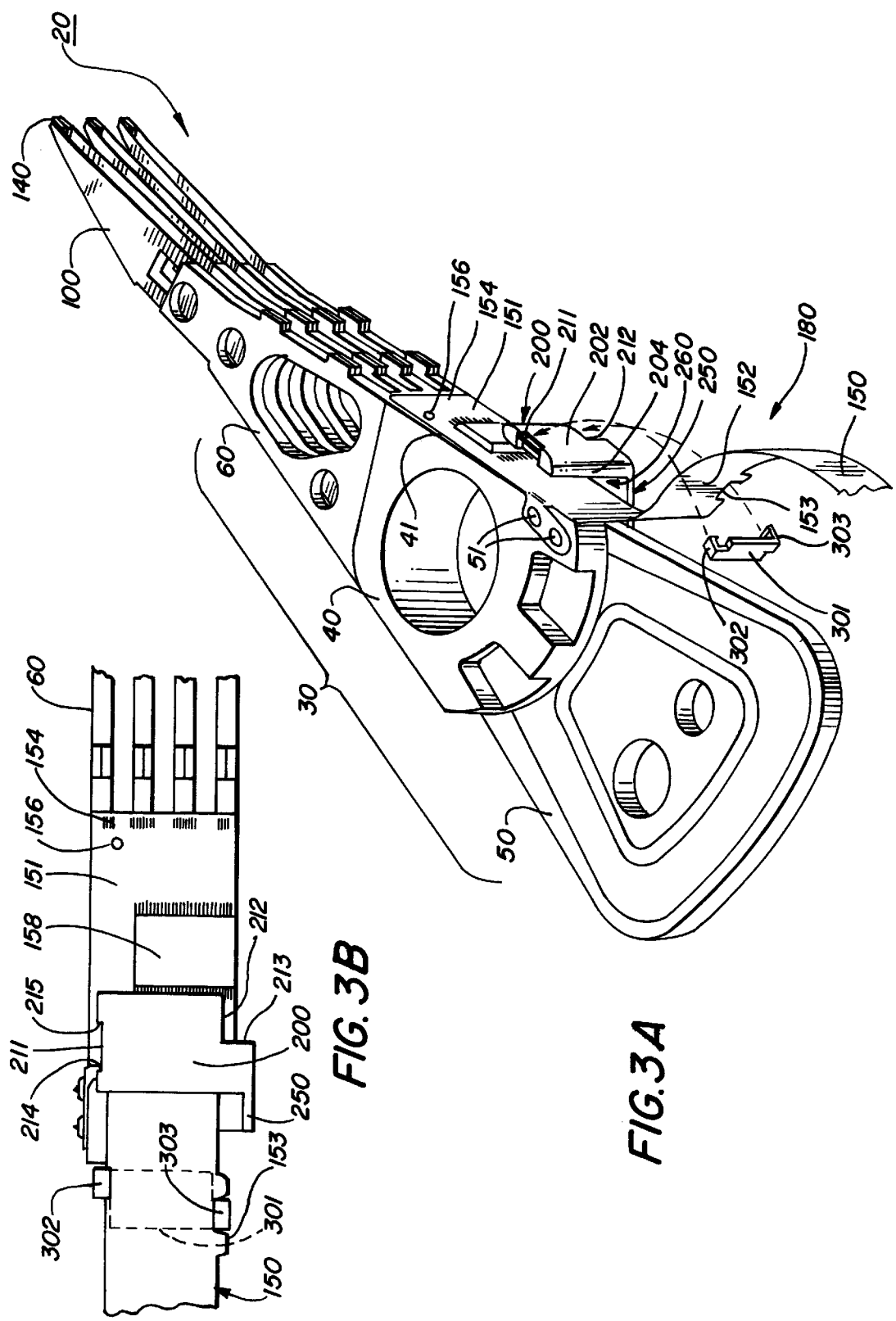

HEAD STACK ASSEMBLY FOR A MAGNETIC DISK DRIVE WITH A PASS-THROUGH FLEX CIRCUIT CABLE

BACKGROUND OF THE INVENTION

1. Field of the Invention

The present invention relates to a disk drive and more particularly to a magnetic disk drive having a head stack assembly with a pass-through flex circuit cable.

2. Description of the Prior Art and Related Information

A typical hard disk drive includes a head disk assembly ("HDA") and a printed circuit board assembly ("PCBA"). The HDA includes at least one magnetic disk ("disk"), a spindle motor for rotating the disk, and a head stack assembly ("HSA") that includes a transducer head ("head") for reading and writing data. The HSA is controllably positioned by a servo system in order to read or write information from or to particular tracks on the disk. The typical HSA has three primary portions: (1) an actuator assembly that moves in response to the servo control system; (2) a head gimbal assembly ("HGA") that extends from the actuator assembly and biases the head towards the disk; and (3) a flex cable assembly that provides an electrical interconnect with minimal constraint on movement.

The industry presently prefers a "rotary" or "swing-type" actuator assembly which conventionally comprises an actuator body that rotates on a pivot assembly between limited positions, a coil portion that extends from one side of the actuator body to interact with one or more permanent magnets to form a voice coil motor, and an actuator arm that extends from an opposite side of the actuator body to support the HGA.

A typical HGA includes a load beam, a gimbal attached to an end of the load beam, and a head attached to the gimbal. The load beam has a spring function which provides a "gram load" biasing force and a hinge function which permits the head to follow the surface contour of the spinning disk. The load beam has an actuator end that connects to the actuator arm and a gimbal end that connects to the gimbal which carries the head and transmits the gram load biasing force to the head to "load" the head against the disk. A rapidly spinning disk develops a laminar air flow above its surface that lifts the head away from the disk in opposition to the gram load biasing force. The head is said to be "flying" over the disk when in this state.

FIG. 1A shows a prior art HSA 820 having the above described portions, i.e. (1) an actuator assembly 830 comprising a coil portion 850, an actuator body 840, and an actuator arm 860; (2) an HGA 900 that includes a head 940; and (3) a flex cable assembly 980 including a flex circuit cable 950 and a flex clamp 959. The flex circuit cable 950 has a first portion 951 connected to a mounting surface 841 on a side of the actuator body and a dynamic loop portion 957 that permits relatively free rotation of the overall HSA. The first portion 951 generally carries a small number of electrical components (e.g. an integrated circuit 958 containing a pre-amplifier) and also contains a terminal pad portion 954 for connecting conductors within the flex cable circuit 950 to insulated wires (not shown) that lead to the head 940 and carry read and write signals transmitted to and from the head.

With reference to FIG. 1B, a substantially U-shaped flex cable guide 870 and a removable snap-fit pin 890 that fits inside the guide 870 and holds the flex circuit cable 950 against its inside surface are used in part to define a desired flex cable trajectory.

The head stack assembly 820 of FIGS. 1A–1B is usually assembled by combining the following subassemblies:

an actuator assembly 830;

a plurality of HGA's 900 including pre-installed heads and wires; and a flex cable assembly 980 comprising the flex circuit cable 950, the flex clamp 959, and the electrical components (e.g. integrated circuit 958).

The three subassemblies are assembled into an overall head stack assembly by starting with the actuator assembly, staking or "swaging" the HGA's onto its arms, and then mounting the flex cable assembly to its mounting surface 841 (usually by making a solder connection 956 to a ground pin (not shown) and to a pair of coil pins 851). At this point, the partially completed head stack assembly appears substantially as shown in FIG. 1A. The head wires, however, must still be attached to the terminal pad portion 954 of the flex circuit cable 950.

However, the guide and pin structure shown in FIGS. 1A–1B may cause damage to the flex circuit cable when handling the head stack assembly during assembly and repair, takes up limited space that could accommodate additional electronic components, and crowds or restricts access to the terminal pad portion of the flex circuit cable.

As to potential damage, the U-guide 870 directs the flex cable circuit 950 forward once it is mounted to a side of the actuator body 840 as shown in FIG. 1A. As a result of this configuration, the flex circuit cable 950 must be pulled back around the outside surface of the U-guide 870 during assembly or handling and may be damaged. For example, the dynamic loop portion 957 limits access to terminal pad portion 954 when attaching the head wires to the terminal pad portion 954. Accordingly, the flex circuit cable 950 must be pulled back during this phase of assembly which may lead to damage of the flex circuit cable.

As to space concerns, the pin 890 limits the area available for mounting electronic components to the flex cable circuit 950 because such area must be kept clear for insertion of the pin 890. If the space next to the pin 890 is unavailable, then electronic components (e.g. integrated circuit 958) must be mounted closer to the terminal pad portion 954. This may encroach on the area needed to attach or repair the head wires in the terminal pad portion 954, particularly when using larger, ultrasonic bonding tools instead of thermal bonding tools. Ultrasonic bonding tools may be used when head wires of "MR heads" (i.e., heads which include magneto-resistive read transducers and inductive write transducers) are attached to terminal pad portion 954.

SUMMARY OF INVENTION

The present invention can be regarded as a head stack assembly for a magnetic disk drive including an actuator body having a mounting surface, an actuator arm cantilevered from the body, a coil portion cantilevered from the body in an opposite direction from the actuator arm and a flex cable guide post having an inner surface and an outer surface. The head stack assembly further includes means connected to the body for supporting the post, the supporting means and the post defining a space between the body and the post; a flex circuit cable having a first portion for mounting to the mounting surface and means for mounting the first portion of the flex circuit cable to the mounting surface with the flex circuit cable extending through the space from the first portion. The flex circuit cable extends beyond the post in a substantially straight position relative to the first portion while in an initial position and curves around the outer surface of the post while in a final position such that in the final position, a second portion of the flex circuit cable abuts the outer surface. The head stack assembly further includes removable means for holding the second portion of the flex circuit cable against the post when the flex circuit cable is in the final position.

The present invention can also be regarded as a magnetic disk drive including a base, a cover attached to the base, a spindle motor attached to the base and a disk mounted on the spindle motor. The magnetic disk drive also includes a head stack assembly attached to the base. The head stack assembly includes an actuator body having a mounting surface, an actuator arm cantilevered from the body, a coil portion cantilevered from the body in an opposite direction from the actuator arm, and a flex cable guide post having an inner surface and an outer surface. The head stack assembly further includes means connected to the body for supporting the post, the supporting means and the post defining a space between the body and the post, a flex circuit cable having an first portion for mounting to the mounting surface, and means for mounting the first portion of the flex circuit cable to the mounting surface with the flex circuit cable extending through the space from the first portion. The flex circuit cable extends beyond the post in a substantially straight position relative to the first portion while in an initial position and curves around the outer surface of the post while in a final position such that in the final position, a second portion of the flex circuit cable abuts the outer surface. The head stack assembly further includes removable means for holding the second portion of the flex circuit cable against the post when the flex circuit cable is in the final position.

BRIEF DESCRIPTION OF THE DRAWINGS

FIG. 3A is a perspective view of a portion of the head stack assembly of FIG. 2A prior to attaching a flex clip;

FIG. 3B is a side elevation view of a portion of FIG. 3A;

DETAILED DESCRIPTION OF THE PREFERRED EMBODIMENTS

Figure 2A:
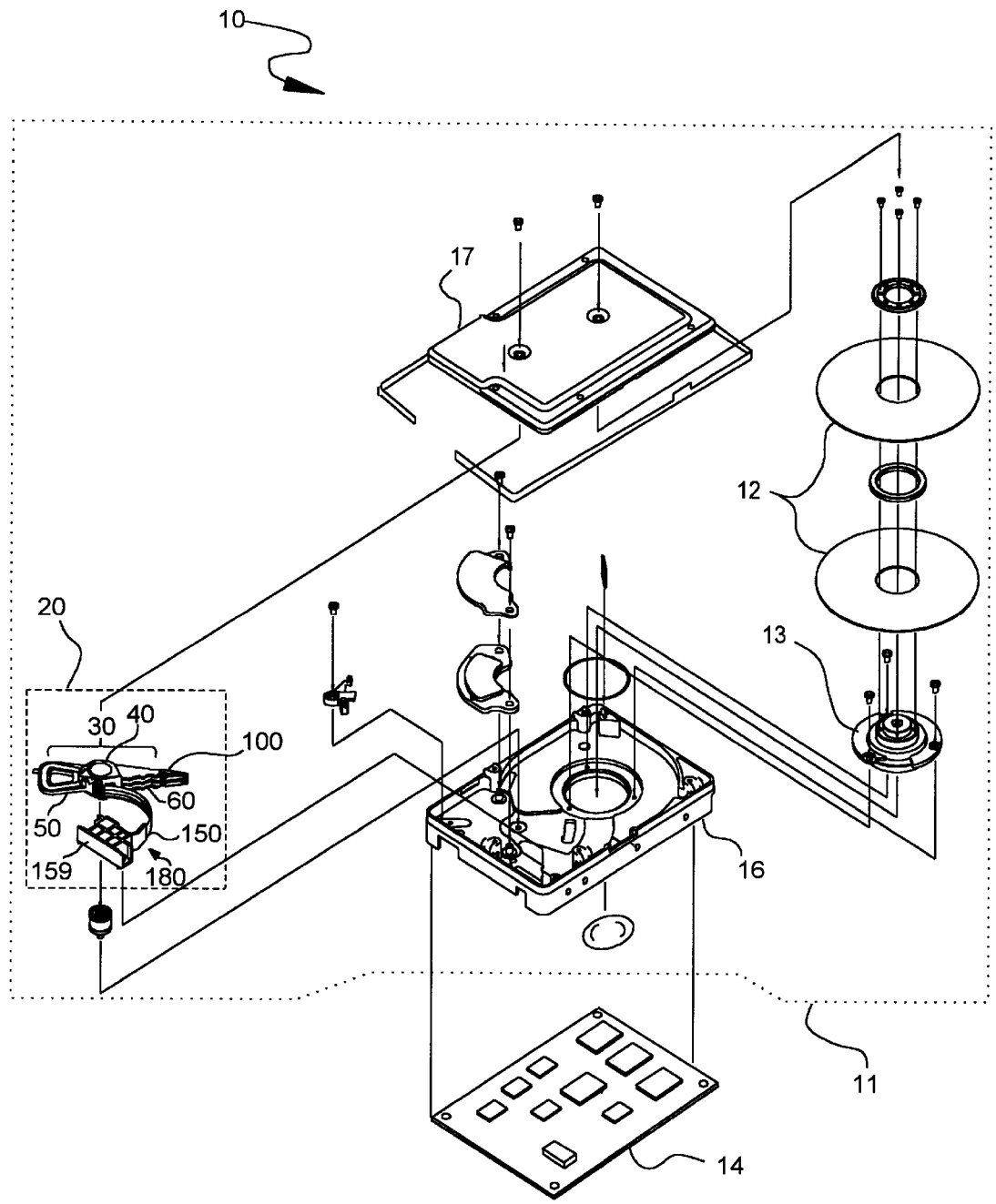
FIG. 2A is an exploded perspective view of a magnetic hard disk drive including a head stack assembly with a pass-through flex circuit cable according to an embodiment of the present invention.
Figure 2B:
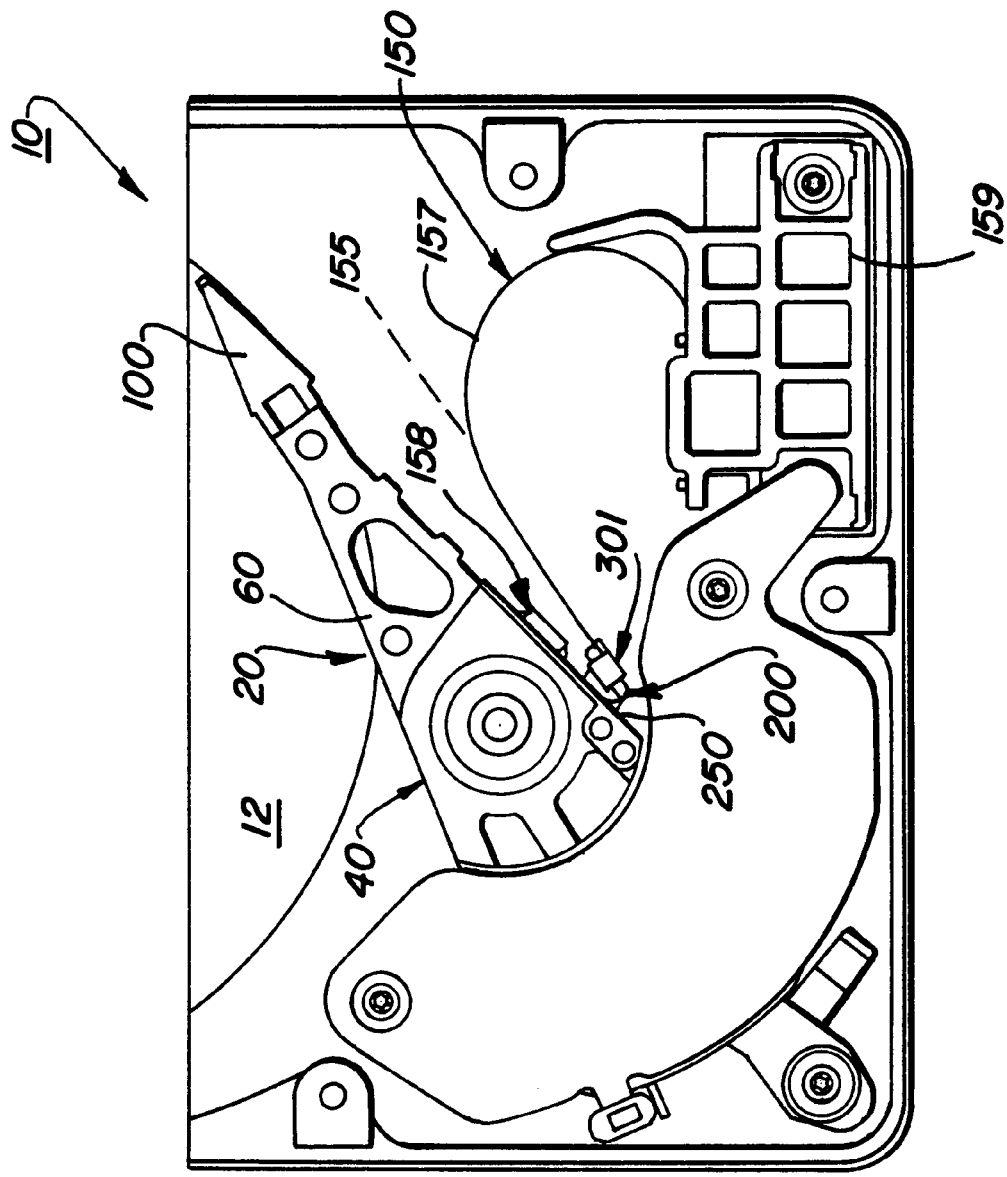
FIG. 2B is a plan view of a portion of a magnetic hard disk drive incorporating a head stack assembly with a pass-through flex circuit cable according to the present invention.

FIGS. 2A and 2B show the principal components of a disk drive such as a magnetic hard disk drive 10 constructed in accordance with the present invention. With reference to FIG. 2A, the preferred disk drive 10 is an integrated drive electronics (IDE) drive which includes an HDA 11 and a PCBA 14.

The HDA 11 includes a base 16 and a cover 17 that collectively house a magnetic disk 12 (two disks are shown), a spindle motor 13, attached to the base, for rotating the disk 12, and a head stack assembly 20. Preferably, spindle motor 13 rotates disk 12 at a constant angular velocity. The head stack assembly 20 comprises a swing-type or rotary actuator assembly 30, at least one head gimbal assembly 100, and a flex cable assembly 180 which includes a flex cable circuit 150 that is mounted to a mounting surface 41 (see FIG. 3A) on a side of the actuator body 40 and a flex clamp 159. The actuator assembly 30 includes actuator body 40, an actuator arm 60 cantilevered from actuator body 40, and a voice coil portion 50 which is cantilevered from the actuator body in an opposite direction from the actuator arm. As shown more clearly in FIG. 3A, the actuator arm 60 supports the head gimbal assembly 100 with a head 140 located at its far end. Returning to FIGS. 2A and 2B, it can be seen that the head stack assembly 20 is located within the HDA 11 such that the head 140 of the head gimbal assembly 100 is biased towards and moveable over the disk 12.

The HDA's storage capacity may be increased, as shown in FIG. 2A, by including several disks 12 and a head stack assembly 20 having a vertical "stack" of head gimbal assemblies 100 and associated heads 140 for each surface of each disk 12, the head gimbal assemblies 100 supported by multiple actuator arms 60.

FIG. 3A shows a head stack assembly 20 according to the present invention which includes a pass-through flex circuit cable 150 that provides the desired trajectory 155 (see FIG. 2B) without folding the flex circuit cable 150 forward at all times and without taking up valuable component space.

Figure 4A:
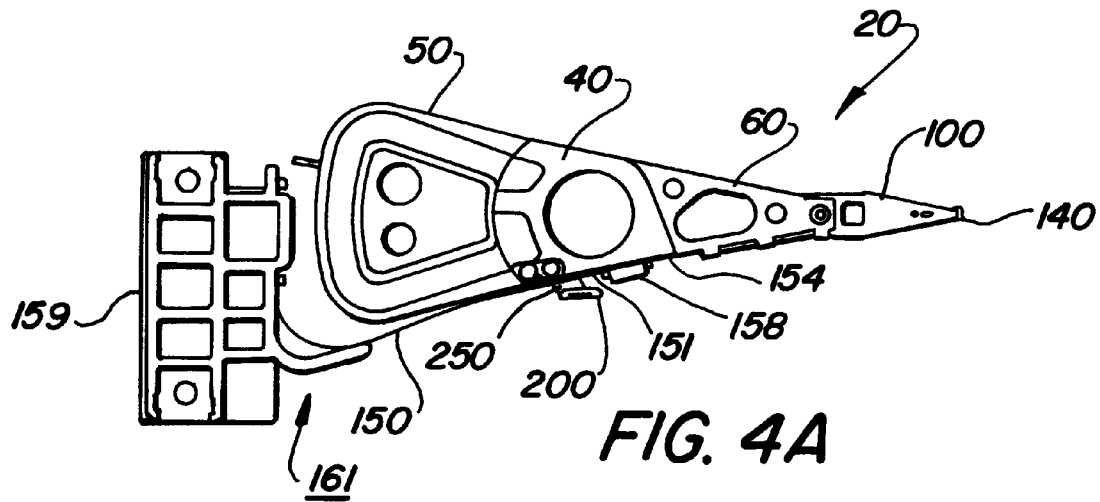
FIG. 4A is a plan view of the head stack assembly of FIG. 3A with the flex circuit cable in an initial unfolded position.
Figure 5A:
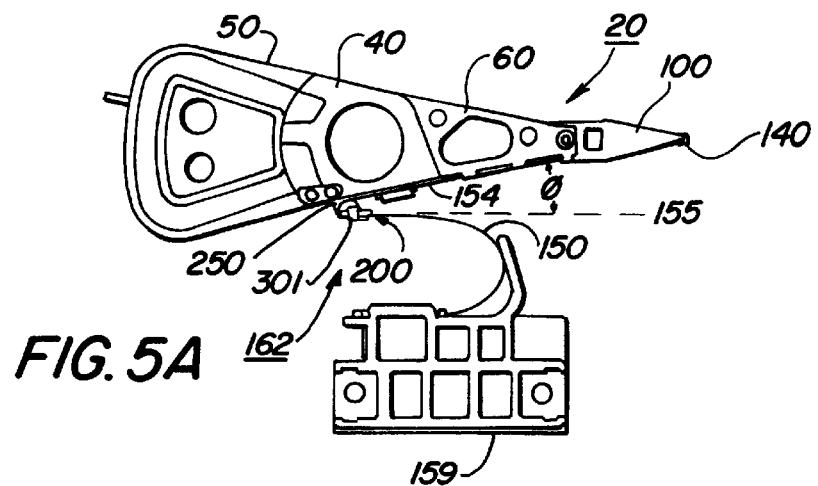
FIG. 5A is a plan view of the head stack assembly of FIG. 3A with the flex circuit cable in a final folded position.

FIGS. 4A and 5A should be reviewed before considering the details of the preferred embodiment. These two figures show a head stack assembly 20 having a pass-through flex circuit cable 150 according to the present invention in a "before" and "after" state. In FIG. 4A, the flex circuit cable 150 is in an initial, substantially straight or unfolded position 161 relative to a first portion 151 and in FIG. 5A the flex circuit cable 150 is in a final, folded-over position 162 prior to attaching flex clamp 159 to a base of a disk drive. The flex circuit cable 150 is less likely to be damaged when it is in the initial unfolded position 161 of FIG. 4A. Also, a side of the head stack assembly 20, which includes electronic components is more accessible when the flex circuit cable is in this initial position 161. After assembling the head stack assembly 20, the flex circuit cable 150 is easily folded over and secured in the final position 162 of FIG. 5 for subsequent installation into the drive 10.

Returning to FIGS. 3A and 3B, the actuator body 40 has a mounting surface 41 and the flex circuit cable 150 includes first portion 151 which, in conjunction with a means for mounting, is secured to the mounting surface 41. The preferred mounting means is a solder connection 156 to a ground pin extending from the mounting surface through a corresponding hole in the flex circuit cable 150. The flex circuit cable 150 is also secured to the mounting site 41, to some degree, by its solder connection to the coil pins 51. Other means for mounting such as physical hold down features or an adhesive may also be used. Once mounted to surface 41, the flex circuit cable 150 extends generally backward along the side of the actuator body 40. As best shown in FIG. 3A, the flex circuit cable 150 includes at least one notch 153 so that a flex clip 301 may be attached to the flex circuit cable 150 while it is in the unfolded position (see e.g. FIG. 3B) so that the flex clip 301 aligns with and is ready for installation onto the post 200.

The head stack assembly 20 further includes a flex cable guide post 200 and a means connected to the actuator body 40 for supporting the post 200 such as a substantially horizontal member 250 extending between the body 40 and the post 200. Other supporting means are possible. What is important is that the supporting means defines a space 260 between body 40 and post 200 through which the flex circuit cable 150 may pass or extend from first portion 151 so that it may be in the initial unfolded position of FIG. 4A or in the final folded position of FIG. 5A.

Figure 4B:
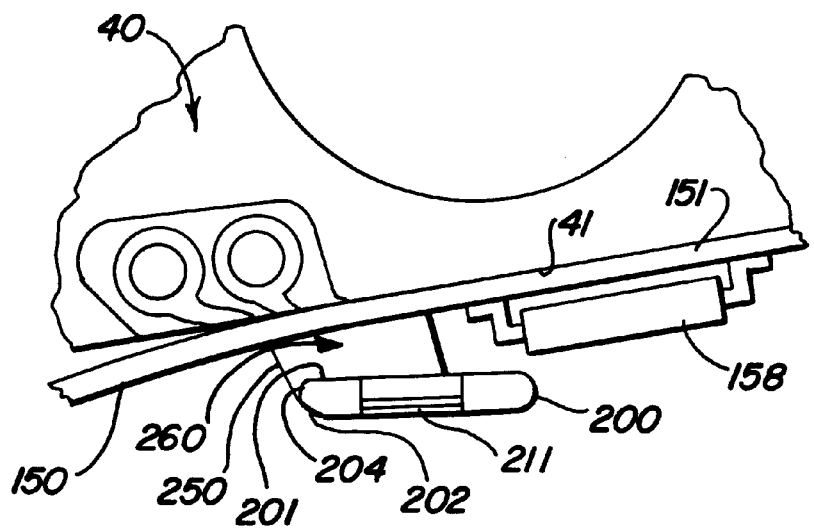
FIG. 4B is an enlarged plan view of a portion of the head stack assembly of FIG. 4A.

The preferred guide post 200 is of substantially rectangular profile such that it has an inner surface 201 (FIG. 4B) facing the actuator body 40 and an outer surface 202 that defines the desired flex cable trajectory 155 (FIG. 2B). Preferably, actuator body 40, post 200 and horizontal member 250 are integrally formed from plastic. With reference to FIG. 4A, the flex circuit cable 150 resides in the space 260 adjacent to the post's inner surface 201 and extends substantially straight therefrom while in the initial unfolded position 161.

Figure 1A:
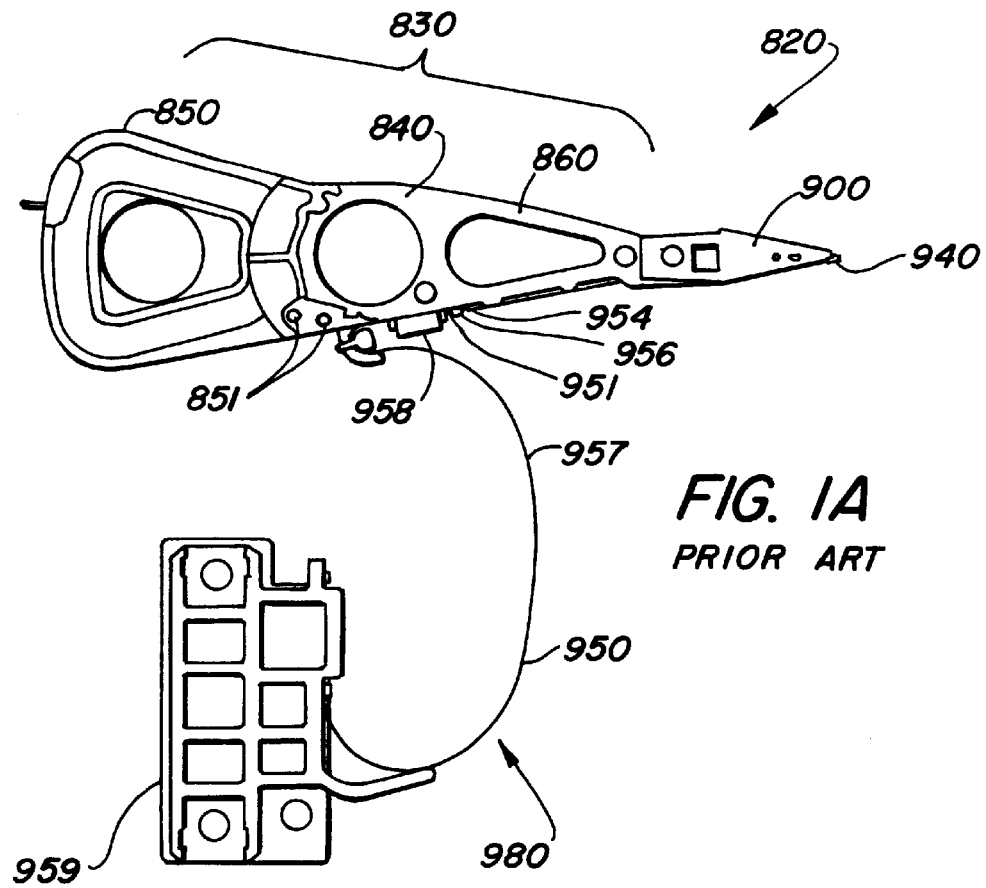
FIG. 1A is a plan view of a prior art head stack assembly.

Because of the pass-through flex circuit cable, the flex circuit cable 150 may temporarily remain substantially straight as further handling or assembly takes place after the flex circuit cable 150 is mounted to the actuator body 40. The attachment of head wires to the terminal pad portion 154 of the flex circuit cable 150, for example, may take place without the need to fold the flex circuit cable 150 out of the way as in the prior art shown in FIG. 1A. Therefore, the flex circuit cable 150 is less likely to be damaged.

Figure 1B:
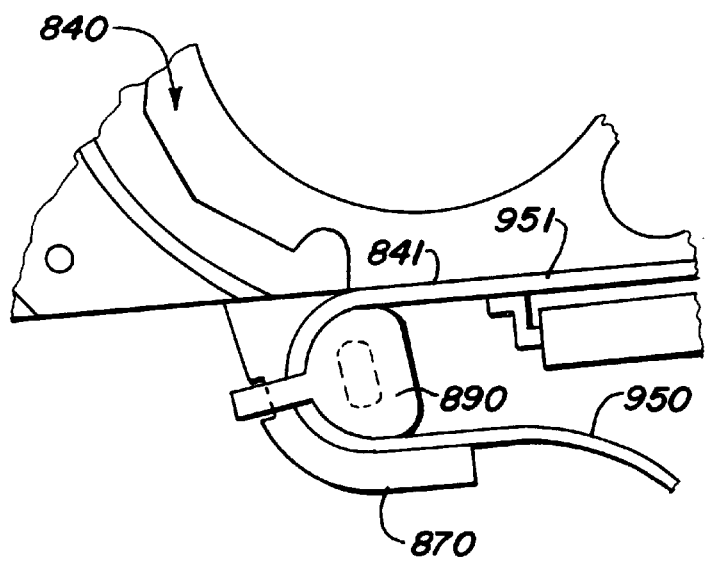
FIG. 1B is an enlarged plan view of a portion of the head stack assembly shown in FIG. 1A.

Another advantage of this invention is that there is more space between the inner surface 201 of the post 200 and the first portion 151 of the flex circuit cable 150 connected to the mounting surface 40. This is significant because it is the first portion 151 that includes electronic components such as the integrated circuit 158. Compare this with prior art FIG. 1B wherein the pin 890 is located directly against the first portion 951 of the flex circuit cable 950. As a result of the space 260 in the present invention, it is possible to position more electronic components on the first portion 151 than otherwise possible, or to position the same number of components further away from the terminal pad portion 154 of the flex circuit cable 150. The latter benefit may make it easier to attach the head wires to the terminal pad portion 154 or make it possible to attach the head wires using larger attachments tools required, for example, in an ultrasonic welding technique. The latter benefit is particularly relevant to attaching the greater number of head wires needed to support MR heads which require twice as many head wires as inductive heads alone.

Figure 5B:
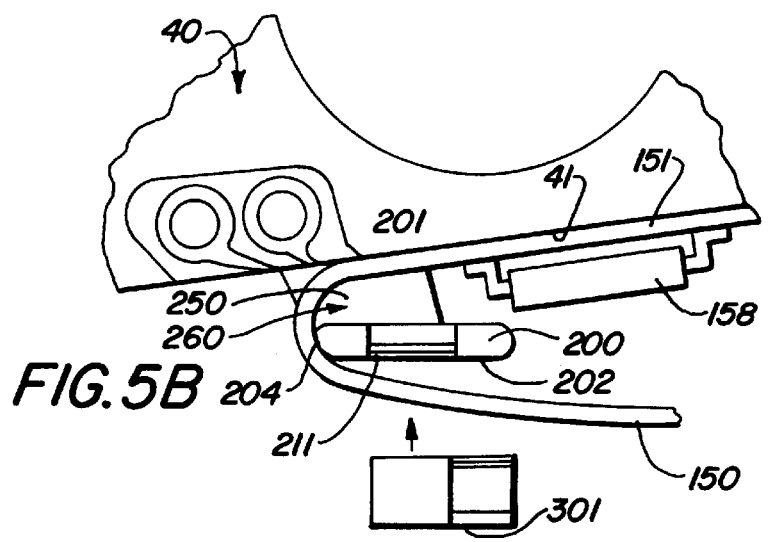
FIG. 5B is an enlarged plan view of a portion of the head stack assembly of FIG. 5A just prior to installation of a means (e.g. a flex clip 301) for holding the flex cable circuit against the post.
Figure 5C:
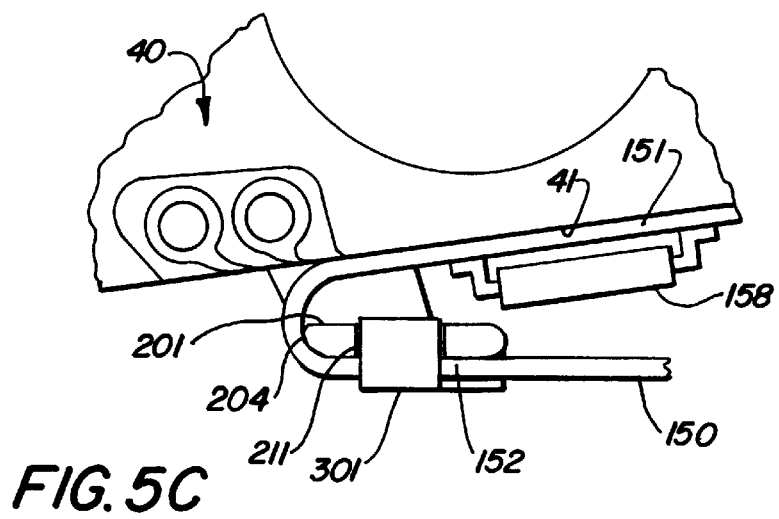
FIG. 5C is an enlarged plan view of a portion of the head stack assembly of FIG. 5A after installation of the flex clip.

FIGS. 5B and 5C are enlarged views of a portion of FIG. 5A with the flex circuit cable 150 folded over into its final position 162 after the head wires have been connected to the terminal pad portion 154. These two figures also show the operation of a preferred removable means, such as removable "flex clip" 301, for holding a second portion 152 of the flex circuit cable 150 which abuts the outer surface 202 of the guide post 200 when flex clip 301 is installed on post 200. FIG. 5B shows the flex circuit cable 150 as it is being wrapped around a front, preferably radius edge 204 of the post, such that the flex circuit cable's second portion 152 is brought adjacent to the post's outer surface 202. FIG. 5B also shows flex clip 301, being positioned to hold the flex circuit cable's second portion 152 against the post's outer surface 202. In FIG. 5C, the flex clip 301 has secured the flex circuit cable 150 to top and bottom notches 211, 212 (FIG. 3B) of the post 200 in its final, folded over position 162 such that flex circuit cable 150 curves around outer surface 202 of post 200. The flex clip 301 is symmetrical along its vertical axis, as shown in FIGS. 3A and 3B, such that assembly workers do not have to consider its orientation during assembly of the head stack assembly 20. Flex clip 301, preferably, has a pair of offset ends 302, 303 and the preferred notches 211, 212 of post 200 are offset from one another in conformance with the offset ends 302, 303 of the flex clip 301. With reference to FIG. 3B, the size and location of bottom notch 212 are determined by the size and location of support member 250. Top notch 211 is offset from bottom notch 212 such that when flex clip 301 is installed on post 200, a sufficient area of contact exists between an inner surface of flex clip 301 and the outer surface of post 200 via flex circuit cable 150. Ends 302 and 303 of flex clip 301 are offset relative to one another to conform with the location of notches 211 and 212 of post 200. Alternatively, the flex clip 301 may be a "straight" piece such that ends 302 and 303 are vertically aligned with one another, and the notches 211, 212 of post 200 are also vertically aligned with one another.

We claim:

1. A head stack assembly for a magnetic disk drive comprising:

an actuator body having a mounting surface;

an actuator arm cantilevered from the body;

a coil portion cantilevered from the body in an opposite direction from the actuator arm;

a flex cable guide post having an exterior surface including an inner surface facing the body and an outer surface facing away from the body;

means connected to the body for supporting the post, the supporting means and the post defining a space between the body and the inner surface of the post;

a flex circuit cable having a first strip portion, a second strip portion, and a third strip portion, the second strip portion being intermediate the first and second strip portions;

means for mounting the first strip portion to the mounting surface such that the first strip portion sits flush against the mounting surface;

removable means for holding the second strip portion against the outer surface;

the space and the removable means enabling the flex circuit cable to define a pass-through adjustable-position arrangement in which the second and third strip portions can be adjusted to occupy either an initial position or a final position such that:

in the initial position, the second and third strip portions extend in a substantially flat plane intersecting the space, providing unobstructed access to the first strip portion without the need for forming multiple folds of the second and third strip portions; and in the final position, the second strip portion forms a fold curving around the outer surface and the third strip portion forms a dynamic loop.

2. The head stack assembly of claim 1 wherein the post supporting means connected to the body comprises a substantially horizontal member extending between the body and the post.

3. The head stack assembly of claim 2 wherein the substantially horizontal member is positioned at a bottom of the post.

4. The head stack assembly of claim 1 wherein the outer surface of the post defines a flex cable trajectory when the flex circuit cable is in the final position.

5. The head stack assembly of claim 1 wherein the first portion of the flex circuit cable includes an electronic component in the space between the body and the post.

6. The head stack assembly of claim 1 wherein the first portion of the flex circuit cable has a terminal pad portion that is outside of the space and substantially clear of the post and exposed on the body for terminal bonding operations.

7. The head stack assembly of claim 1 wherein the body, the post, and the post supporting means are integrally formed.

8. The head stack assembly of claim 1 wherein the body, the post, and the post supporting means are integrally formed of plastic.

9. The head stack assembly of claim 1 wherein the post has a substantially rectangular profile.

10. The head stack assembly of claim 9 wherein the post has a radius edge around which the flex circuit cable is wrapped when in the final position.

11. The head stack assembly of claim 9 wherein the outer surface of the post is oriented at a desired angle relative to the body to define a flex cable trajectory when the flex circuit cable is in the final position.

12. A head stack assembly for a magnetic disk drive comprising:
    an actuator body having a mounting surface;
    an actuator arm cantilevered from the body;
    a coil portion cantilevered from the body in an opposite direction from the actuator arm;
    a flex cable guide post having an exterior surface including an inner surface facing the body and an outer surface facing away from the body;
    means connected to the body for supporting the post, the supporting means and the post defining a space between the body and the inner surface of the post;
    a flex circuit cable having a first strip portion, a second strip portion, and a third strip portion, the second strip portion being intermediate the first and second strip portions;
    means for mounting the first strip portion to the mounting surface such that the first strip portion sits flush against the mounting surface;
    removable means for holding the second strip portion against the outer surface;
    the space and the removable means enabling the flex circuit cable to define a passthrough adjustable-position arrangement in which the second and third strip portions can be adjusted to occupy either an initial position or a final position such that:
    in the initial position, the second and third strip portions extend in a substantially flat plane intersecting the space, providing unobstructed access to the first strip portion without the need for forming multiple folds of the second and third strip portions; and in the final position, the second strip portion forms a fold curving around the outer surface and the third strip portion forms a dynamic loop,
    wherein the removable means comprises a flex clip, the flex circuit cable passing between the outer surface and the flex clip when in the final position.

13. The head stack assembly of claim 12 wherein the post has top and bottom notches for receiving the flex clip.

14. The head stack assembly of claim 13 wherein the flex clip and the top and bottom notches are symmetrical about their vertical axes such that either end of the flex clip may be installed in the top and bottom notches of the post.

15. The head stack assembly of claim 13 wherein the post supporting means comprises a substantially horizontal member extending between the body and a bottom end of the post.

16. The head stack assembly of claim 15 wherein the top notch is offset from the bottom notch, wherein a first side and a second side of the top notch are bounded to secure the flex clip, and wherein a first side of the bottom notch is bounded by the substantially horizontal member but an opposite second side is open to conserve space.

17. The head stack assembly of claim 9 wherein the flex clip has ends that are offset in conformance with the top and bottom notches of the post.

18. The head stack assembly of claim 12 wherein the second portion has at least one notch for retaining the flex clip while the flex circuit cable is in the initial position.

19. A magnetic disk drive comprising:
    a base;
    a cover attached to the base;
    a spindle motor attached to the base;
    a disk mounted on the spindle motor; and
    a head stack assembly attached to the base, the head stack assembly comprising:
       an actuator body having a mounting surface;
       an actuator arm cantilevered from the body;
       a coil portion cantilevered from the body in an opposite direction from the actuator arm;
       a flex cable guide post having an exterior surface including an inner surface facing the body and an outer surface facing away from the body;
       means connected to the body for supporting the post, the supporting means and the post defining a space between the body and the inner surface of the post;
       a flex circuit cable having a first strip portion, a second strip portion, and a third strip portion, the second strip portion being intermediate the first and second strip portions;
       means for mounting the first strip portion to the mounting surface such that the first strip portion sits flush against the mounting surface;
       removable means for holding the second strip portion against the outer surface;
       the space and the removable means enabling the flex circuit cable to define a pass through adjustable-position arrangement in which the second and third strip portions can be adjusted to occupy either an initial position or a final position such that:
          in the initial position, the second and third strip portions extend in a substantially flat plane intersecting the space, providing unobstructed access to the first strip portion without the need for forming multiple folds of the second and third strip portions; and
          in the final position, the second strip portion forms a fold curving around the outer surface and the third strip portion forms a dynamic loop.

20. The magnetic disk drive of claim 19 wherein the post supporting means comprises a substantially horizontal member extending between the body and the post.

21. The magnetic disk drive of claim 20 wherein the substantially horizontal member is positioned at the bottom of the post.

22. The magnetic disk drive of claim 19 wherein the outer surface of the post defines a flex cable trajectory when the flex circuit cable is in the final position.

23. The magnetic disk drive of claim 19 wherein the removable holding means comprises a flex clip, the flex circuit cable passing between the post and the flex clip when in the final position.

24. The magnetic disk drive of claim 23 wherein the post has top and bottom notches for receiving the flex clip.

25. The magnetic disk drive of claim 24 wherein the flex clip and the top and bottom notches are symmetrical along their vertical axes such that either end of the flex clip may be installed in the top and bottom notches of the post.

26. The magnetic disk drive of claim 25 wherein the post supporting means comprises a substantially horizontal member extending between the body and a bottom end of the post.

27. The magnetic disk drive of claim 26 wherein the top notch is offset from the bottom notch, wherein a first side and a second side of the top notch are bounded to secure the flex clip, and wherein a first side of the bottom notch is bounded by the substantially horizontal member but an opposite second side is open to conserve space.

28. The magnetic disk drive of claim 27 wherein the flex clip has ends that are offset in conformance with the top and bottom notches of the post.

29. The magnetic disk drive of claim 23 wherein the second portion of the flex circuit cable has at least one notch for retaining the flex clip while the flex circuit cable is in the initial position.

30. The magnetic disk drive of claim 1 wherein the first portion of the flex circuit cable includes an electronic component in the space between the body and the post.

31. The magnetic disk drive of claim 1 wherein the first portion of the flex circuit cable has a terminal pad portion that is outside of the space and substantially clear of the post and exposed on the body for terminal bonding operations.

32. The magnetic disk drive of claim 19 wherein the body, the post, and the post supporting means are integrally formed.

33. The magnetic disk drive of claim 19 wherein the body, the post, and the post supporting means are integrally formed of plastic.

34. The magnetic disk drive of claim 19 wherein the post has a substantially rectangular profile.

35. The magnetic disk drive of claim 34 wherein the post has a radius edge around which the flex circuit cable is wrapped when in the final position.

36. The magnetic disk drive of claim 34 wherein the outer surface of the post is oriented at a desired angle relative to the body to define a flex cable trajectory when the flex circuit cable is in the final position.

37. A method of making a head stack assembly for a magnetic disk drive, the method comprising:

provicing an assembly comprising an actuator body having a mounting surface, an actuator arm cantilevered from the body, and a coil portion cantilevered from the body in an opposite direction from the actuator arm, a flex cable guide post having an exterior surface including an inner surface facing the body and an outer surface facing away from the body, and means connected to the body for supporting the post, the supporting means and the post defining a space between the body and the inner surface of the post;

providing a flex circuit cable having a first strip portion, a second strip portion, and a third strip portion, the second strip portion being intermediate the first and second strip portions;

placing the flex circuit cable such that the first strip portion sits flush against the mounting surface and the second and third strip portions occupy an initial position in which the second and third strip portions extend in a substantially flat plane intersecting the space, providing unobstructed access to the first strip portion without the need for forming multiple folds of the second and third strip portions;

mounting the first strip portion to the mounting surface;

repositioning the second and third strip portions to a final position in which the second strip portion forms a fold curving around the outer surface and the third strip portion forms a dynamic loop; and securing removable means to hold the second strip portion against the outer surface.

* * * * *